United States Patent
Xu et al.

(10) Patent No.: US 12,334,976 B2
(45) Date of Patent: Jun. 17, 2025

(54) INFORMATION SAMPLING ANALYSIS METHOD, OPTICAL SPLITTER, FIBER SPLICE TRAY, LOCAL SIDE SAMPLING EQUIPMENT, AND PLATFORM

(71) Applicant: Chengdu Zhuoguang Technology Co., Ltd., Chengdu (CN)

(72) Inventors: Hangyu Xu, Chengdu (CN); Jinming Wu, Chengdu (CN); Qiushuang Xu, Chengdu (CN); Hui Zhang, Chengdu (CN)

(73) Assignee: Chengdu Zhuoguang Technology Co., Ltd., Chengdu (CN)

( * ) Notice: Subject to any disclaimer, the term of this patent is extended or adjusted under 35 U.S.C. 154(b) by 272 days.

(21) Appl. No.: 18/143,705

(22) Filed: May 5, 2023

(65) Prior Publication Data
US 2023/0388013 A1 Nov. 30, 2023

(30) Foreign Application Priority Data
May 30, 2022 (CN) .......................... 202210604079.3

(51) Int. Cl.
*H04B 10/079* (2013.01)
*H04B 10/25* (2013.01)

(52) U.S. Cl.
CPC ... *H04B 10/0791* (2013.01); *H04B 10/07955* (2013.01); *H04B 10/2589* (2020.05)

(58) Field of Classification Search
None
See application file for complete search history.

(56) References Cited

FOREIGN PATENT DOCUMENTS

| CN | 112583481 A | 3/2021 | |
| CN | 113973240 A | * 1/2022 | ......... H04Q 11/0067 |

\* cited by examiner

*Primary Examiner* — David W Lambert
(74) *Attorney, Agent, or Firm* — Bayramoglu Law Offices LLC

(57) ABSTRACT

The present disclosure provides an information sampling analysis method, an optical splitter, a fiber splice tray, local side sampling equipment. The local side sampling equipment obtains an optical or electrical signal of local side equipment, and establishes a connection relationship between a terminal device and the local side equipment based on data reported by the terminal device. In this way, the service communication line connection relationship across the network can be obtained. According to the present disclosure, active equipment needs to be introduced to the local side only, the passive optical cross-connection network does not need to be transformed, thus the engineering quantity of the network deployment is small and the investment is low. Whether a service optical or electrical signal exists in a line is determined based on a line occupation identifier, to update in real time communication line information stored in the information sampling analysis platform.

7 Claims, 6 Drawing Sheets

INFORMATION SAMPLING ANALYSIS METHOD, OPTICAL SPLITTER, FIBER SPLICE TRAY, LOCAL SIDE SAMPLING EQUIPMENT, AND PLATFORM

CROSS-REFERENCE TO RELATED APPLICATION

This patent application claims priority to Chinese Patent Application No. 202210604079.3, filed with the China National Intellectual Property Administration on May 30, 2022, the disclosure of which is incorporated by reference herein, in its entirety, as part of the present application.

TECHNICAL FIELD

The present disclosure relates to the field of optical fiber communication technologies, and especially, to an information sampling analysis method, an optical splitter, a fiber splice tray, local side sampling equipment, and a platform.

BACKGROUND

Massive optical fiber resources are mainly managed through a resource management system. When the fiber optic cable is completed, the cable sections, the fiber cores and end information are entered into the platform, and such information does not change unless the cable is cut and spliced, thus the resource accuracy rate in the engineering stage is extremely high. After delivery of the fiber optic cable, when the service is to be opened, the platform configures (or removes) communication lines for both ends of the service, which contains fiber core information of each cable section, and the outside lineman needs to install the fiber optic patch cord on site (server room or cable transfer box). After the outside lineman installs the fiber optic patch cord and opens the service, the work order is returned, and the resource management system confirms that the fiber core has been occupied. However, in the process of using optical fibers, the following problems may occur.

When opening the communication line, the outside lineman does not install the fiber optic patch cord for fiber cores configured by the resource management system, and chooses another optical fiber. After the communication line is opened, the resource post is not notified to modify the pre-occupied resources, and the order is accepted directly. In this case, the fiber core is actually idle, but the resource management system shows that it is occupied.

When the communication line is removed, the outside lineman does not go to the site to remove the fiber optic patch cord, and the order is directly accepted. In this case, the resource management system shows that the fiber core is idle. However, when the fiber core is used again, the outside lineman finds that the corresponding fiber core and terminal are occupied, and the service cannot be opened.

It can be learned that, due to frequent installation and removal of services and fiber optic cable cut, the communication line information entered in the service opening stage may be wrong and errors may accumulate for a long time. Some line data on the platform does not match the actual situation, and the following cases may occur: A fiber core is actually idle while the resource management system marks it as occupied, or a fiber core is actually occupied while the resource management system marks it as idle. When the fiber core occupation data on the resource management system is inconsistent with the actual situation, repeated backorders are caused, reducing the opening efficiency of the communication line and the use efficiency of the resources. Specifically, if the fiber core pre-allocated by the resource management system has the patch terminal not removed at the optical transfer box or the Optical Distribution Frame (ODF), the outside lineman dare not to re-install the patch cord (which causes business interruption if there is a communication line), and the order can only be rejected. If the communication line has been removed, but the platform data has not been updated, the platform cannot allocate fiber cores, causing the communication line bypass or triggering new construction.

In order to improve the use efficiency of the fiber optic cables and accuracy of the platform data, the industry has developed the intelligent Optical Distribution Network (ODN) technology, with the main idea of adding electronic tags to the optical transfer terminal, such that the equipment identifies whether the fiber patch cord operation of the service opening personnel is consistent with the work order data. However, the intelligent ODN solution requires active transformation of all passive optical cross-connection points on the network, which requires a large amount of engineering and high investment, and is difficult to implement across the network.

SUMMARY

The purpose of the present disclosure is to overcome the problems of the prior art and provide an information sampling analysis method, an optical splitter, a fiber splice tray, local side sampling equipment, and a platform.

The purpose of the present disclosure is achieved by the following technical solution: An information sampling analysis method is executed by an information sampling analysis platform, and includes a communication line information determining step:

receiving sampling information that is sent by local side sampling equipment and has been split by an optical splitter or sampling information that is sent by local side sampling equipment and has been split by an optical splitter and on which photoelectric conversion has been performed, where the sampling information includes time stamp information, an ID of the local side sampling equipment, a logical ID and a first message sequence, the logical ID is encrypted information obtained after the ID of the local side sampling equipment, ODF identifier, the first message sequence are encrypted by a hash algorithm, the first message sequence includes a board number, a port serial number, ODF terminal information, local side transceiver identifier, line occupation identifier, signal power information, and signal power change identifier;

receiving monitoring data sent by a terminal device, where the monitoring data includes the time stamp information, ID information of the terminal device, terminal transceiver identifier information, and a second message sequence;

determining whether a service signal exists on a corresponding communication line based on the line occupation identifier, and the local side transceiver identifier;

establishing a path mapping relationship between the terminal device and a local side equipment corresponding to the local side sampling equipment based on an ID of the terminal device and the ID of the local side sampling equipment, and extracting pre-stored ODF terminal information and fiber core physical connection information, to obtain real-time communication line information; and comparing whether the real-time communication line information is the same as pre-stored communication line information, and if not, locating and correcting error information in the pre-stored communication line information.

In an embodiment, the method may further include:

an initialization step: sending initialization query information to the local side sampling equipment; receiving and saving initialization information reported by the local side sampling equipment, and performing encryption processing on the ID of the local side sampling equipment, the ODF identifier, and the first message sequence in the initialization information through the hash algorithm, to generate the logical ID; and a sampling information determining step: receiving the sampling information sent by the local side sampling equipment and determining, based on the logical ID in the sampling information, whether a board and/or port of the local side sampling equipment have/has changed; and if yes, performing the initialization step; or if not, saving the sampling information and performing the communication line information determining step.

In an embodiment, the method may further include a signal power update step:

receiving the sampling information sent by the local side sampling equipment;

determining whether information about the signal power change identifier in the current sampling information is different from information about the signal power change identifier in sampling information of a previous frame; and if not, skipping any operation; or if yes, saving the signal power information in the current sampling information.

In an example, the method may further include a communication line verification step executed by the terminal device and specifically including:

receiving real-time communication line information sent by the information sampling analysis platform, and performing routing based on the real-time communication line information, to verify whether the real-time communication line information is correct.

In an example, the method may further include a verification step executed by the terminal device and specifically including:

receiving code-containing handshake information required to open a corresponding service and sent by the information sampling analysis platform; and verifying the corresponding terminal device based on the code-containing handshake information, and if the verification succeeds, opening the corresponding service.

It is further noted that the technical features corresponding to the above examples may be combined or replaced with each other to form a new technical solution.

This application further provides an optical splitter for information sampling analysis. An optical splitting device is disposed in the optical splitter to perform bidirectional optical splitting, and a first communication port, a first monitoring port, a second communication port, and a second monitoring port are disposed on the optical splitting device;

the first communication port is used as an incoming end of the optical splitter, the second communication port and the second monitoring port are correspondingly used as an outgoing end of the optical splitter; or the second communication port is used as an incoming end of the optical splitter, and the first communication port and the first monitoring port are correspondingly used as an outgoing end of the optical splitter; and the communication ports are connected to a communication cable, the monitoring ports are connected to a monitoring cable, and an optical signal obtained by the communication port corresponding to the outgoing end of the optical splitter accounts for 95%-99%.

This application further provides a fiber splice tray for information sampling analysis, including a fiber splice tray body, where the above-described optical splitter for optical signal detection is disposed in the fiber splice tray body, and a first optical fiber entering through a wire inlet of the fiber splice tray is connected to the first communication port or the second communication port of the optical splitter; and when the first optical fiber is connected to the first communication port, the second communication port is connected to an adapter at a wire outlet of the fiber splice tray; or when the first optical fiber is connected to the second communication port, the first communication port is connected to an adapter at a wire outlet of the fiber splice tray.

This application further provides local side sampling equipment for information sampling analysis, including multiple sampling boards, where the sampling boards are connected to an optical splitter via an optical fiber or a fiber optic cable and are used to pre-process an optical and/or electrical signal; the sampling board is signally connected to a backboard via a fiber optic cable, and the backboard is used for collecting and forwarding a signal collected by the sampling board; the backboard is signally connected to a master control board via a fiber optic cable; the master control board is connected to a communication device and is connected to an Ethernet through the communication device; the local side sampling equipment further includes a detection board that is signally connected to the backboard, and the detection board is signally connected to the sampling board via an optical fiber.

This application further provides an information sampling analysis platform, including the above optical splitter, the above local side sampling equipment, local side equipment, a terminal device and a back-end control subsystem, where the local side equipment is connected to a communication port of the optical splitter, another communication port of the optical splitter is connected to the local side equipment or the terminal device, a monitoring port of the optical splitter is connected to the local side sampling equipment, and another terminal of the local side sampling equipment is connected to the back-end control subsystem.

In an example, the back-end control subsystem may further include an information analysis software system deployed in the cloud, and the system may include a user communication line information database distributed in the local side sampling equipment, installation and maintenance terminal management software, unified local side network management software and a database.

Compared with the prior art, the present disclosure achieves following beneficial effects:

(1) In an example, the local side sampling equipment obtains an optical or electrical signal of the local side equipment, and establishes a connection relationship between the terminal device and the local side equipment based on data reported by the terminal device. In this way, the service communication line connection relationship across the network can be obtained. According to the present disclosure, active equipment needs to be introduced to the local side only, the passive optical cross-connection network does not need to be transformed, thus the engineering quantity of the network deployment is small and the investment is low. In addition, whether the service optical or electrical signal exists in the line is determined based on the line occupation identifier, to update in real time the communication line information stored in the information sampling analysis platform. In this way, long-term accumulation of line information errors is avoided, consistency between the line information stored in the platform and actual line information is ensured, and unified management of optical fibers and cable resources across the network is realized. The waste of optical line or circuit resources is avoided, and the maintenance complexity and cost of photoelectric circuit are reduced.

(2) In an example, the logical ID is generated based on the ID of the local side sampling equipment, the ODF identifier and the first message sequence. The information sampling analysis platform compares the logical ID reported by the equipment this time with the previous logical ID each time querying the communication line monitoring result. If the IDs are inconsistent, it is determined that the board/port of the equipment has changed, and there is no need to update the communication line information based on the sampling information of the current equipment. This ensures the accuracy of the communication line information collected by the platform. Furthermore, the platform does not need to compare one by one whether the equipment ID, the port serial number, the ODF terminal information and the like have changed, thereby reducing the data processing workload and the system load.

(3) In an example, the platform directly identifies the optical power change identifier without further comparing whether the signal power of the previous frame is different from the signal power of the current frame, thereby reducing the platform's demand for computing resources and lowering the costs.

(4) In an example, the communication line information analyzed by the platform is routed and processed by the terminal, such that the communication line is further automatically verified, to ensure the accuracy and reliability of the obtained communication line information. There is no need for manual line testing on site, thereby reducing the costs.

(5) In an example, the terminal device performs verification based on the code-containing handshake information, and then opens the corresponding communication service, ensuring the accuracy and reliability of the service opening.

(6) In an example, the optical splitter is compatible with two monitoring ports. When the optical signal transmission direction of the communication line changes or is uncertain, the outgoing end can always provide two transmission paths to enable both the optical signal transmission function and the optical signal monitoring function, thereby enhancing the reliability of the entire fiber optic communication network. Further, the incoming end of the optical splitter is directly connected to the original communication line or the wire inlet/outlet of the existing fiber splice tray, which can realize optical signal transmission and monitoring based on the original communication line, and is suitable for reconstruction of the fiber optic communication network.

(7) In an example, the existing fiber splice tray is replaced by the fiber splice tray integrating the optical splitter, such that the fiber splice tray has the light splitting function while also enabling the optical signal transmission and monitoring when the optical signal transmission path changes or the optical signal transmission path is uncertain. This is suitable for new construction of the fiber optic communication network.

(8) In an example, the local side sampling equipment acquires and identifies the optical signals in the communication line and transmits the signals to the information sampling analysis platform. The detection board is disposed to directly detect the connection status, the quality, and the failure spots of the optical fibers. This resolves the problem that the connection relationship of the idle fiber cores in the adjacent fiber optic cable cannot be detected when the fiber core is occupied or is idle.

BRIEF DESCRIPTION OF THE DRAWINGS

The specific implementations of the present disclosure will be further described in detail below with reference to the accompanying drawings. The drawings described here are provided for further understanding of this application, and constitute a part of this application. Same reference numerals are used in the drawings to indicate the same or similar parts. The exemplary embodiments of the present disclosure and illustrations thereof are intended to explain this application, but do not constitute inappropriate limitations to this application.

Figure 1:
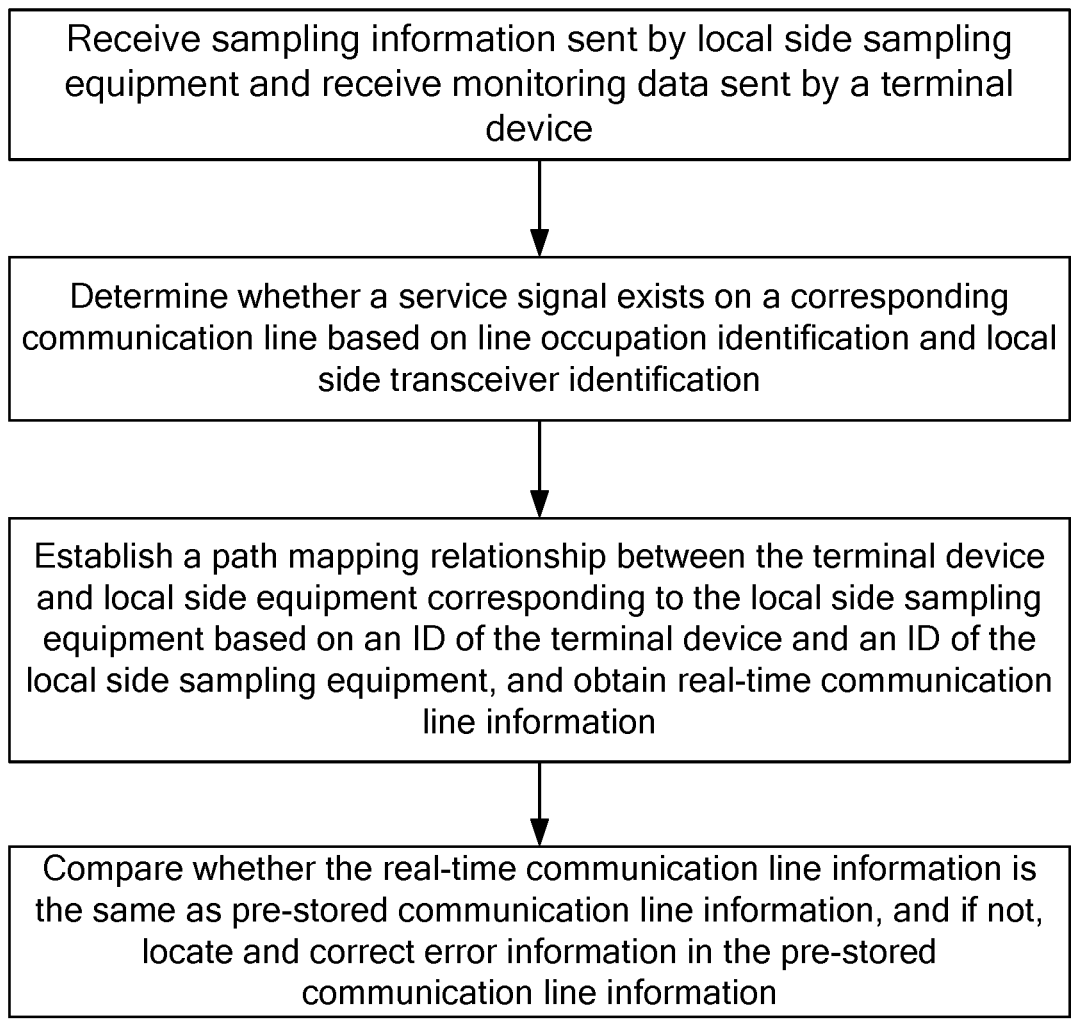
FIG. 1 is a flowchart of a method according to an embodiment of the present disclosure.

Reference numerals: optical splitter 1, first communication port 11, first monitoring port 12, second communication port 13, second monitoring port 14, first connection cable 21, first fiber optic connector 22, second connection cable 23, second fiber optic connector 24, third connection cable 25, third multi-fiber push on (MPO) connector 26, fourth connection cable 27, second MPO connector 28, fiber splice tray body 3, splice region 31, fiber winding body 32, adapter 33, and first optical fiber 4.

DETAILED DESCRIPTION OF THE EMBODIMENTS

The technical solutions of the present disclosure are described clearly and completely below with reference to the drawings. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

In the description of the present disclosure, it should be noted that orientations or position relationships indicated by terms "center", "top", "bottom", "left", "right", "vertical", "horizontal", etc. are orientation or position relationships as shown in the drawings, and these terms are just used to facilitate description of the present disclosure and simplify the description, but not to indicate or imply that the mentioned device or elements must have a specific orientation and must be established and operated in a specific orientation, and thus, these terms cannot be understood as a limitation to the present disclosure. Moreover, terms such as "first" and "second" are merely intended for the purpose of description, and should not be construed as indicating or implying relative importance.

In the description of the present disclosure, it should be noted that, unless otherwise clearly specified and defined, meanings of terms "install", "connect with", and "connect to" should be understood in a board sense. For example, the connection may be a fixed connection, a detachable connection, or an integral connection; may be a mechanical connection or an electrical connection; may be a direct connection or an indirect connection with use of an intermediate medium; or may be intercommunication between two components. A person of ordinary skill in the art may understand specific meanings of the foregoing terms in the present disclosure based on a specific situation.

In addition, the technical features involved in the various implementations of the present disclosure described below may be combined with each other as long as they do not constitute a conflict with each other.

In an example, as shown in FIG. 1, an information sampling analysis method is executed by an information sampling analysis platform integrating fiber core analysis software, and the information sampling analysis platform is in the physical form of an x86 server and used for analyzing the line occupation status. Specifically, the fiber core analysis software is centrally deployed and connected to local side sampling equipment via the Internet Protocol (IP) network, to receive and record periodic test results. The fiber core analysis software establishes an interface with a resource system of the platform to query the fiber optic cable data in the resource system and receive work orders for fiber core pre-occupation for optical line opening and fiber core release for optical line removal; and further instructs, according to the work orders, the local side sampling equipment to measure the specified fiber cores. The fiber core analysis software on the platform is used for communication line information determining, specifically including the following steps.

S11: Sampling information that is sent by the local side sampling equipment and has been split by an optical splitter or sampling information that is sent by the local side sampling equipment and has been split by an optical splitter and on which photoelectric conversion has been performed is received. The sampling information includes time stamp information, an ID of the local side sampling equipment, a logical ID and a first message sequence, the logical ID is encrypted information obtained after the ID of the local side sampling equipment, ODF identifier, the first message sequence are encrypted by using a hash algorithm, the first message sequence includes a board number, a port serial number, ODF terminal information, local side transceiver identifier, line occupation identifier, signal power information, and signal power change identifier. In addition, monitoring data sent by a terminal device is received. The monitoring data includes the time stamp information, ID information of the terminal device, terminal transceiver identifier information and a second message sequence.

S12: Whether a service signal exists on a corresponding communication line is determined based on the line occupation identifier and the local side transceiver identifier information. The transceiver identification corresponds to a downlink line and an uplink line and is introduced for precisely determining the occupation status of each communication line.

S13: A path mapping relationship between the terminal device and local side equipment corresponding to the local side sampling equipment is established based on an ID of the terminal device and the ID of the local side sampling equipment, and pre-stored ODF terminal information and fiber core physical connection information are extracted, to obtain real-time communication line information.

S14: Whether the real-time communication line information is the same as pre-stored communication line information is determined, and if not, error information in the pre-stored communication line information is located and corrected.

Further, the sampling information in this example is a part of the optical signal that is split by the optical splitter and does not affect optical transmission of the original service or an electrical signal converted from the optical signal. Generally, the sampling information accounts for 1%-5%, preferably 3% of the optical signal of the original service.

Figure 2:
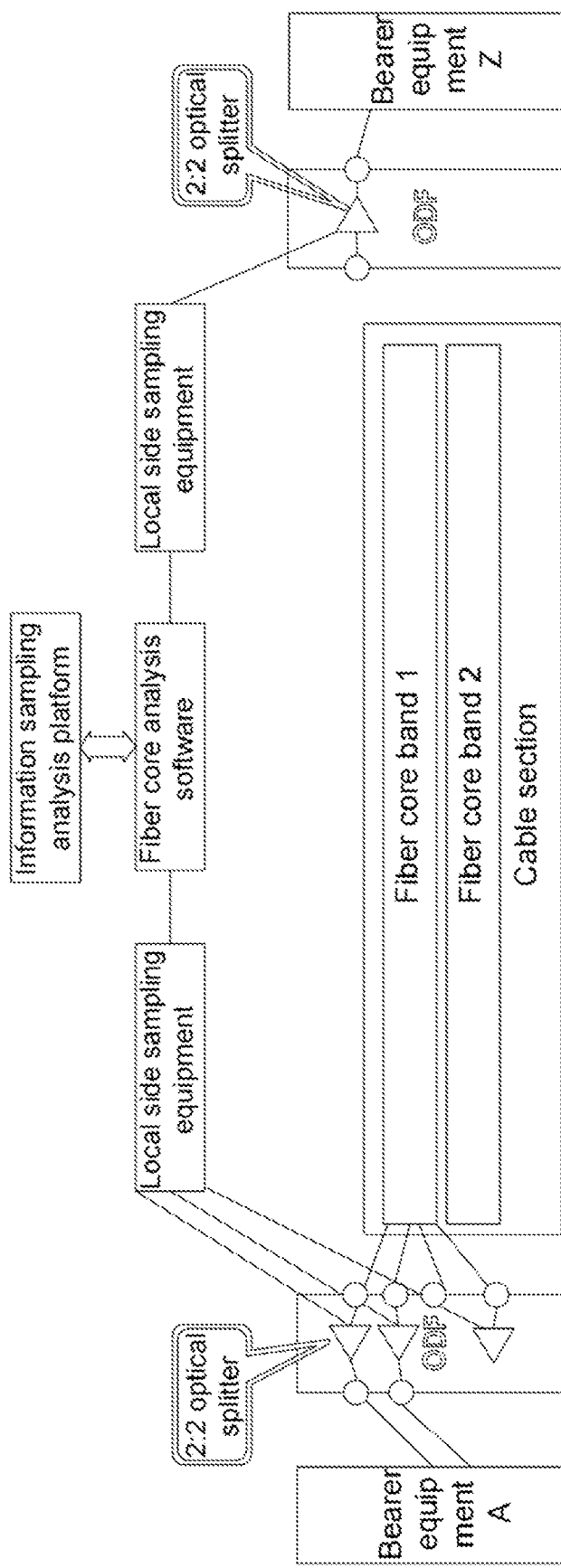
FIG. 2 is a schematic diagram of the connection among a platform, local side sampling equipment and an ODF according to an embodiment of the present disclosure.

Further, as shown in FIG. 2, the local side sampling equipment is in a one-to-one correspondence with the local side equipment, and the information sampling analysis platform (hereinafter referred to as the platform) stores a mapping relationship between the local side sampling equipment and the local side equipment, that is, a mapping relationship between IDs of the local side sampling equipment and IDs of the local side equipment. Specifically, each piece of local side equipment is provided with the local side sampling equipment, and the local side equipment includes, but is not limited to, the ODF. In this example, photoelectric conversion is performed on the sampling information acquired by the local side sampling equipment. To be specific, the sampling information carrying the current line operation status of the local side equipment can be transmitted to the platform in the optical or electrical form, which ensures the information security of the network while expanding the diversity of the network-wide architecture.

Further, the terminal device is equipped with terminal sampling software that is installed in the form of plug-in in the terminal device such as home gateways and IPRAN U, and regularly encapsulates data packets, transceiver identification and time stamp information normally received and sent by the terminal device into IP messages, and send Transmission Control Protocol/Internet Protocol (TCP/IP) messages to the platform.

Further, the line occupation identifier is used to indicate whether an optical signal currently exists in the optical line. When receiving the optical signal via the optical splitter, the local side sampling equipment analyzes the current optical signal power and other optical attribute parameters, and encapsulates the optical signal data, a server room ID, the ID of the local side sampling equipment, the ODF, a column, a terminal serial number, the local side transceiver identifier, the time stamp information, the signal power information, and the signal power change identifier into a TCP/IP message and sends the TCP/IP message to the platform. When the local side sampling equipment does not receive the optical signal via the optical splitter, the optical signal data, a server room ID, the ID of the local side sampling equipment ID, the ODF, a column, a terminal serial number, the local side transceiver identifier, the time stamp information and repeated 10101010 are encapsulated in a TCP/IP message and sent to the platform. The repeated 10101010 is the line occupation identifier indicating that no optical signal currently exists in the line.

Further, in step S13, the platform can obtain, based on the ID of the terminal device and the ID of the local side sampling equipment, a fiber core for transmitting the corresponding service optical signal or a jumper relationship between the fiber core and the fiber optic cable, that is, the real-time communication line information. Specifically, the platform obtains a data packet of an ODF terminal from the local side sampling equipment, and determines whether there is an optical signal at the terminal depending on whether the packet contains repeated 10101010. In addition, the platform determines, based on the transceiver identification, whether the local side equipment is receiving or sending. If the extracted data packet does not contain the repeated 10, the platform analyzes a frame format (MSTP, OTN, PON, Ethernet, or the like) of the signal, to determine an optical line type, equipment identification, an Ethernet address, and an IP address. Similarly, the platform analyzes the packet sent by the terminal device, establishes a one-to-one (or many-to-one) correspondence between the local side equipment and the terminal device based on the equipment identification, the IP address and other information, and further forms complete real-time communication line information based on the pre-stored ODF terminal information and physical connection relationship of the fiber cores. Certainly, the real-time communication line information further includes the occupation status of each communication optical line or photoelectric composite line. If the corresponding service optical signal exists, the communication line is in the occupation status, indicating that the current communication line has opened a corresponding communication service and cannot be removed; if the corresponding service optical signal does not exist, the communication line is not in the occupation status, indicating that the current communication line has not opened a corresponding communication service and can be removed. In this way, invalid occupation is released and use efficiency of the fiber optic cable can be improved. When the method in this application is applied to improve the existing network, active equipment (local side sampling equipment) needs to be introduced at the local side only, and the passive optical cross-connection network does not need to be transformed, thus the engineering quantity of the network deployment is small and the investment is low, and the feasibility is high.

Further, the communication line information pre-stored on the platform indicates a corresponding connection relationship between ODF terminals of each service optical fiber, which is continuously acquired and updated during the network construction process. The pre-stored communication line information is compared with the above real-time communication line information, to correct the wrong service optical line information stored by the platform. In this way, long-term accumulation of line information errors is avoided, consistency between the line information stored in the platform and actual line information is ensured, and unified management of optical fiber and cable resources across the network is realized. The waste of optical line or circuit resources is avoided, and the maintenance complexity and cost of photoelectric circuits are reduced.

In an option, the above steps S12 and S13 can be executed in an interchangeable order, which does not affect the real-time analysis results of the line occupation status according to this application.

Figure 3:
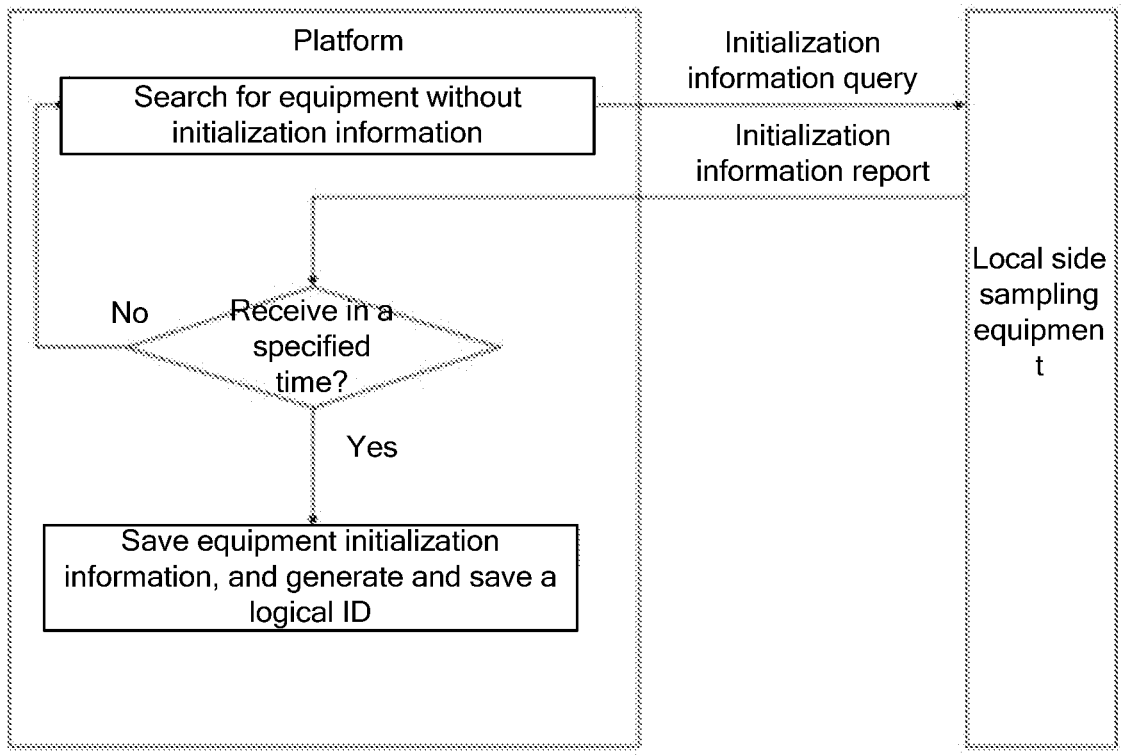
FIG. 3 is a flowchart of an initialization step according to an embodiment of the present disclosure.
Figure 4:
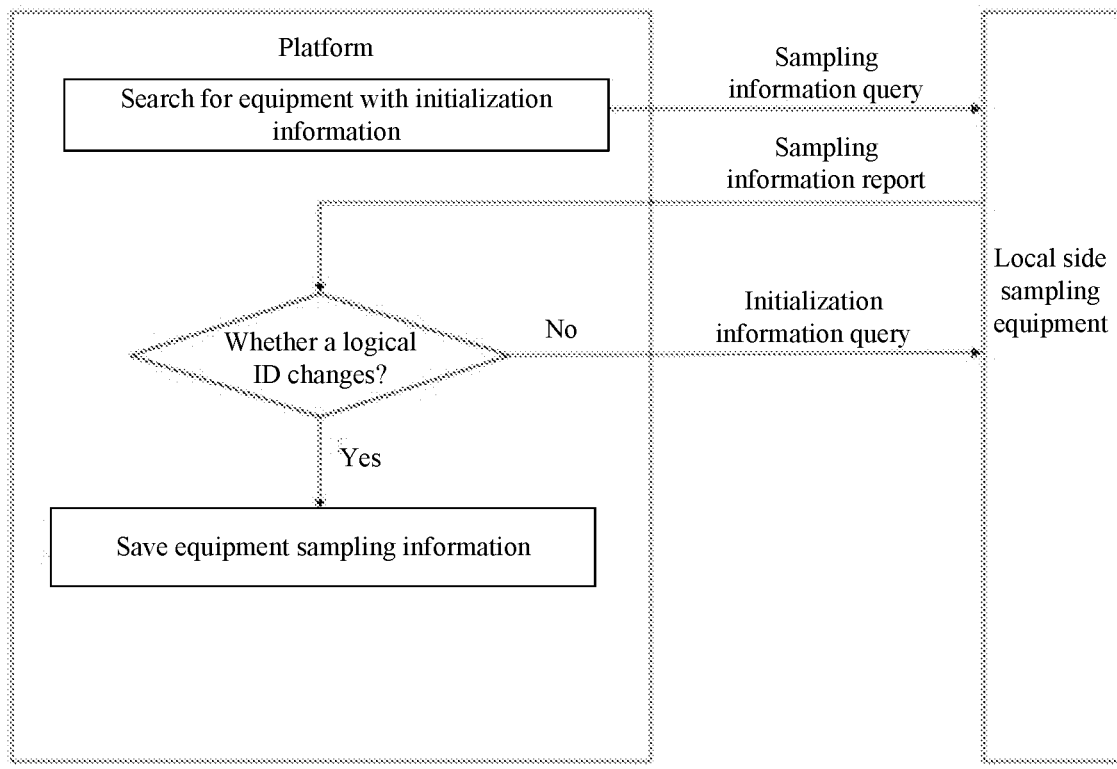
FIG. 4 is a flowchart of a sampling information determining step according to an embodiment of the present disclosure.

In an example, a short TCP connection is established between the local side sampling equipment and the platform. To reduce the platform load, the platform disconnects the short TCP connection each time after querying the monitoring result of the local side sampling equipment, and establishes the connection and queries again after a fixed time. However, during operation, the local side sampling equipment may expand/reduce the board capacity or modify the correspondence between the equipment ports and ODF terminals due to fiber optic cable cut, core number change, or the like. During operation of the platform and the local side sampling equipment, the platform cannot determine whether there is a change in boards or ports in the registered equipment. In case of equipment capacity expansion, the equipment is manually deleted in the platform, re-registered and initialized, with a large manual workload; or the platform compares whether the current port serial number and ODF terminal number of the equipment are consistent with the last record after each query, which increases the system load. This application is optimized for the above situation. As shown in FIG. 3 and FIG. 4, the method is executed by the platform, and specifically includes the following steps.

S01: An initialization step: sending initialization query information to the local side sampling equipment; receiving and saving initialization information reported by the local side sampling equipment, and performing encryption processing on the ID of the local side sampling equipment, the ODF identifier, and the first message sequence in the initialization information through the hash algorithm, to generate the logical ID. A message of the initialization query information sequentially includes a TCP message header, a message type, a message sequence number, and the ID of the local side sampling equipment. A message of the initialization information sequentially includes a TCP message header, a message type, a message sequence number, the ID of the local side sampling equipment, the ODF identifier and content.

S02: A sampling information determining step: receiving the sampling information sent by the local side sampling equipment and determining, based on the logical ID in the sampling information, whether a board and/or port of the local side sampling equipment have/has changed; and if yes, performing the initialization step; or if not, saving the sampling information and performing the communication line information determining step. Preferably, in this step, the platform needs to send a sampling information query message to the local side sampling equipment first, and the local side sampling equipment receives the message and reports the sampling information to the platform. Specifically, the sampling information query message sequentially includes a TCP message header, a message type, a message sequence number, the ID of the local side sampling equipment and the logical ID. A message of the sampling information sent by the local side sampling equipment sequentially includes a TCP message header, a message type, a message sequence number, the ID of the local side sampling equipment, the logical ID and content. The content is a message sequence, including a board serial number, a port serial number, transceiver identification, power change identifier, optical power information, and the like. The optical power information is indicated in a 16-bit binary code, and the local side sampling equipment first converts the optical power to the binary code and then performs displacement encryption before transmitting to the platform.

In this example, in addition to the equipment ID as the unique identification in the communication protocol, the logical ID is added, and the logical ID is generated by hashing a long string of multiple bytes consisting of the equipment ID, the ODF identifier, and the content. Each time the platform queries the monitoring result, the equipment reports its own logical ID, and the platform compares the logical ID reported by the equipment this time with the logical ID of the last time. If the IDs are inconsistent, it is determined that the equipment board/port has changed, and the platform does not record the result of this polling and reinitializes the information of the equipment. This reduces the data processing workload and the system load.

Figure 5:
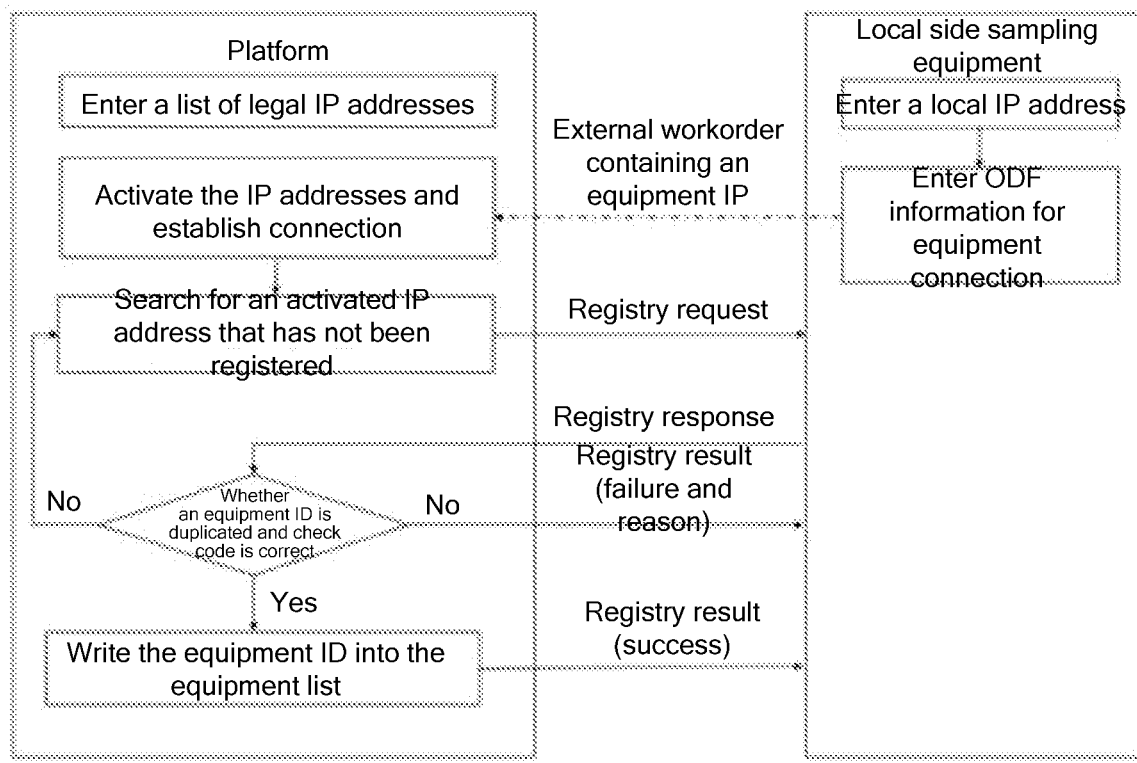
FIG. 5 is a flowchart of a registration step according to an embodiment of the present disclosure.

Further, before the initialization step, S00 registration step, that is, adding the local side sampling equipment in the platform, is performed. In this example, the step is executed by the platform and includes the following sub-steps as shown in FIG. 5.

S001: The platform sends a registration request message to the local side sampling equipment. The registration request message sequentially includes a TCP message header, a message type and a message sequence number.

S002: The platform determines, based on received registration response information, whether the local side sampling equipment meets a registration condition; if not, the registration fails; otherwise, the ID of the local side sampling equipment is written into an equipment list to complete the registration. A message of the registration response information sequentially includes a TCP message header, a message type, a message sequence number, the ID of the local side sampling equipment and check code based on a layer-2 exclusive OR algorithm.

Further, the platform determines whether the registration condition is met in the following specific steps:

The platform determines whether the ID of the local side sampling equipment is duplicated; if yes, the registration condition is not met; or if not, it is determined whether the checksum code is correct; if yes, the ID of the local side sampling equipment is entered into the equipment list and a prompt message of successful registration is sent to the local side sampling equipment.

Further, before step S00 is performed, the platform enters a list of legal IP addresses, and the local side sampling equipment enters a local IP address and connected ODF information.

In an example, the platform regularly polls the local side sampling equipment to record optical power information of each port in the database for analysis. However, the platform monitors and records power information of millions of ports, causing frequent write and read operations to the database and large demand for computing resources. To resolve the technical problem, this application proposes a signal power information update step based on the above signal analysis method, and the step is performed by the platform and specifically includes the following sub-steps.

S21: Receive the sampling information sent by the local side sampling equipment.

S22: Determine whether information about the signal power change identifier in the current sampling information is different from information about the signal power change identifier in sampling information of a previous frame; and if not, skip any operation; or if yes, save signal power information in the current sampling information. Specifically, in this application, 4-bit optical power change identifier is added in the communication protocol, and the local side sampling equipment compares whether the current optical power is different from the last optical power; if yes, the 4-bit optical power change identifier is reported as 0001; or if not, the 4-bit optical power change identifier is reported as 0000. The platform directly identifies the optical power change identifier, and updates the data in the database when it is 0001, and does not update the data in the database when it is 0000. This reduces the demand for and cost of computing resources.

In an example, the method of this application further includes a communication line verification step. The step is performed by the terminal device and specifically includes the following sub-steps:

receiving real-time communication line information sent by the information sampling analysis platform, and performing routing based on the real-time communication line information, to verify whether the real-time communication line information is correct. Specifically, the terminal device is a terminal device with a routing function. After receiving the real-time communication line information sent by the platform, the terminal device performs routing processing based on a fiber core involved in the communication line information, for example, routing the communication line in the form of sending heartbeat packets to another terminal device in the corresponding communication line, to further automatically verify the communication line, so as to ensure the accuracy and reliability of the obtained communication line information. There is no need for manual line testing on site, thereby reducing the costs.

In an example, the method of this application further includes a verification step. The step is performed by the terminal device provided with an encoder and specifically includes the following sub-steps.

S31: Receive code-containing handshake information required to open a corresponding service and sent by the information sampling analysis platform.

S32: Verify the corresponding terminal device based on the code-containing handshake information; and if the verification succeeds, open the corresponding service, thereby ensuring the accuracy and reliability of the service opening; or if the verification fails, it indicates that one of the terminal devices does not support opening the current service currently, or a previous communication connection between the platform and the terminal device has been disconnected.

The above examples are combined to obtain a preferred example of the method of this application performed by the platform and specifically including the following steps.

S1': Send registration request information to the local side sampling equipment.

S2': Determine, based on received registration response information, whether the local side sampling equipment meets a registration condition; if not, the registration fails; otherwise, the ID of the local side sampling equipment is written into an equipment list to complete the registration.

S3': Send initialization query information to the local side sampling equipment; receive and save initialization information reported by the local side sampling equipment, and perform encryption processing on the ID of the local side sampling equipment, the ODF identifier, and the first message sequence in the initialization information through the hash algorithm, to generate the logical ID.

S4': Receive the sampling information sent by the local side sampling equipment and monitoring data sent by the terminal device.

S5': Determine, based on the logical ID in the sampling information, whether a board and/or port of the local side sampling equipment have/has changed; and if yes, perform the initialization step; or if not, save the sampling information.

S6': Determine whether a service signal exists in a corresponding communication line based on the line occupation identifier, and the local side transceiver identifier.

S7': Establish a path mapping relationship between the terminal device and local side equipment corresponding to the local side sampling equipment based on the ID of the terminal device and the ID of the local side sampling equipment, and extract pre-stored ODF terminal information and fiber core physical connection information, to obtain real-time communication line information.

S8': Determine whether the real-time communication line information is the same as pre-stored communication line information, and if not, locate and correct error information in the pre-stored communication line information.

S9': Determine whether information about the signal power change identifier in the current sampling information is different from information about the signal power change identifier in sampling information of a previous frame; and if not, skip any operation; or if yes, save signal power information in the current sampling information.

S10': Send the real-time communication line information to the terminal device, to enable the terminal device to perform the communication line verification step; or further send the code-containing handshake information required to open the corresponding service to the terminal device, to enable the terminal device to perform the verification step.

Specifically, the information sampling analysis method in this application may be applied to the following application scenarios.

Scenario 1: Optical line opening and route verification. Specifically, in the optical line opening process, optical line wiring data is configured by the platform, and a verification work order (recording optical line connection information and occupation status information of the corresponding optical service) is sent to the platform. The platform immediately queries the status of all the fiber cores and detection ports in the optical line route, and checks the fiber core status in the wiring route. If the route status is idle, the platform prompts that the fiber cores configured in the optical line route are currently idle, indicates the specific idle duration parameters, and confirms that the optical line can be opened. If some ports or fiber cores are occupied, new ports are recommended to replace them, and the platform feeds back a work order exception, and requires re-wire.

Scenario 2: Resource routing inspection. Specifically, during resource routing inspection, the status of the communication line is inspected, and is compared with the resource occupation status provided by the platform. Abnormal data is recorded for auditing the user resource data. In an option, the platform sends the current communication line information to the terminal device, and the terminal device performs routing inspection of the corresponding fiber core line based on the current communication line information.

Scenario 3: Optical line status monitoring. Specifically, during optical line monitoring, the status of each section of the optical line route is detected to determine whether the optical line is abnormal, and the abnormal data is recorded for line maintenance support.

Scenario 4: Outside line receipt verification for optical line opening. Specifically, in the optical line opening process, after completion of the outside line installation and maintenance, the order receipt is verified. If the construction is performed as ordered, the order receipt verification succeeds; if not, the order receipt verification fails.

Scenario 5: Optical line removal, resource release and outside line order receipt testing. To be specific, during optical line removal, the removal work order is sent to the platform, and the platform queries the status of all fiber cores and detection ports in the optical line route to check the fiber core status of the wiring route. If the status of all routes is idle, the optical line can be removed. The outside line installation and maintenance personnel carry out on-site fiber removal according to the optical line route. After construction, a handheld terminal is connected to the specified terminal and sends optical pulse for check, and the platform receives the optical pulse. The optical pulse is compared with the optical line route specified in the work order, and the result is returned to the platform.

Figure 6:
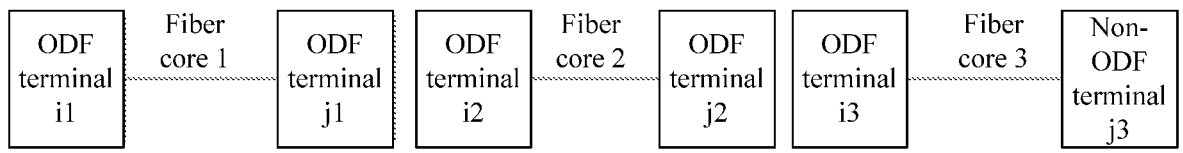
FIG. 6 is a schematic diagram of optical path opening according to an embodiment of the present disclosure.

To further illustrate the invention idea of this application, as shown in FIG. 6, the method in this application is described by using an example of specific optical line opening. Before the optical line opening, the platform specifies local side fiber core code and ODF terminal code. After obtaining the work order of the optical line opening, the platform provides the detection and analysis results. The specific analysis process is as follows:

a) Query associated local side sampling equipment and ports based on code of ODF terminals i1, j1, i2, j2, and i3.

b) Determine whether there is an optical signal in the fiber core based on the sampling information. If there is no optical signal, and the resource data of the fiber core is accurate, a code list of the ODF terminal and the local side fiber core is returned, and the status of each ODF terminal and fiber core is Idle. If an optical signal is detected at ODF terminals x and y at both ends of a fiber core a, but there is no optical signal at other ODF terminals, a code list of the ODF terminal and the local side fiber core is returned, in which a status of the fiber core a is Occupied, statuses of the ODF terminals x and y are Occupied, and statuses of other ODF terminals and fiber cores are Idle. If an optical signal is detected at an ODF terminal x on one end of a fiber core a, but there is no optical signal at other ODF terminals, a code list of the ODF terminal and the local side fiber core is returned, in which a status of the fiber core a is "Fiber core end data or local side sampling equipment data error", a status of the ODF terminal x is Occupied, and statuses of other ODF terminals and fiber cores are Idle.

c) If an optical signal is detected at any ODF terminal, an error message is returned to the platform, and the platform reassigns an optical circuit.

Figure 7:
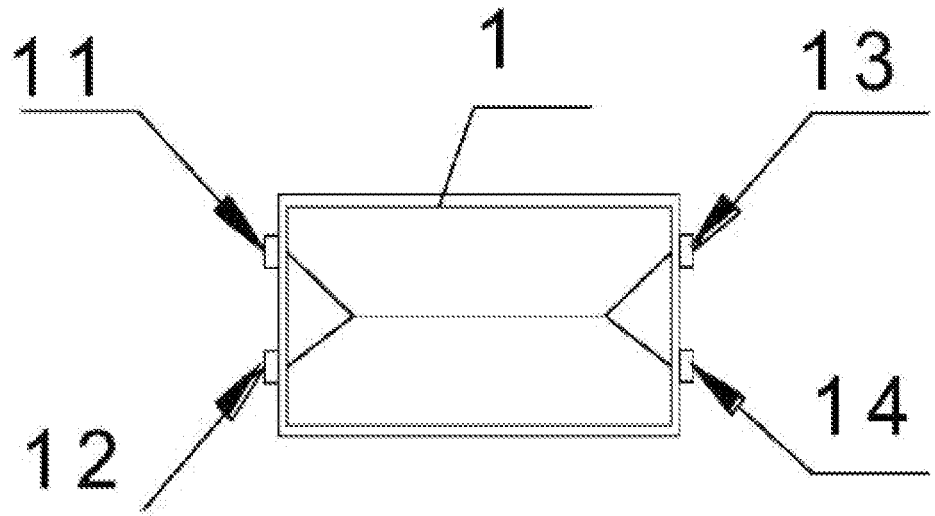
FIG. 7 is a schematic structural diagram of an optical splitter according to an embodiment of the present disclosure.

In an example, this application further provides an optical splitter for information sampling analysis. As shown in FIG. 7, an optical splitting device is disposed in the optical splitter 1. The optical splitting device in this example is specifically an optical splitter chip, used to split two optical signals into two. In this case, the optical splitter 1 is specifically a Planar Lightwave Circuit (PLC) optical splitter, the optical splitter chip enables 95%-99% of the communication optical signal to reach from a communication port to another communication port, and enables 1%-5% of the communication optical signal to reach from a communication port to a monitoring port. To be specific, correspondingly, the optical splitter chip is provided with a first communication port 11, a first monitoring port 12, a second communication port 13, and a second monitoring port 14.

If the first communication port 11 is used as an incoming end of the optical splitter 1, the second communication port 13 and the second monitoring port 14 are correspondingly used as an outgoing end of the optical splitter 1; or if the second communication port 13 is used as an incoming end of the optical splitter 1, the first communication port 11 and the first monitoring port 12 are correspondingly used as an outgoing end of the optical splitter 1. Specifically, the incoming end of the optical splitter 1 is an optical information input end, the outgoing end is an optical information output end, and the outgoing end includes a communication port for optical information transmission and a monitoring port for optical information monitoring. It is noted that preferably, the first communication port 11 and the first monitoring port 12 are provided at one end of the optical splitter 1, and the second communication port 13 and the second monitoring port 14 are provided at the other end of the optical splitter 1, as shown in FIG. 1. Certainly, in an option, the first communication port 11 and the second communication port 13 or the second monitoring port 14 may alternatively be provided at one end of the optical splitter 1, and the other two ports are provided at the other end of the optical splitter 1. That is, the external port structure of the optical splitter 1 can be set arbitrarily, provided that when a communication optical signal is input into the first communication port 11, 95%-99% of the communication optical signal is output from the second communication port 13 for optical signal transmission, and correspondingly, 1%-5% of the communication optical signal is output from the second monitoring port 14 for optical signal monitoring; or when a communication optical signal is input into the second communication port 13, 95%-99% of the communication optical signal is output from the first communication port 11 for optical signal transmission, and correspondingly, 1%-5% of the communication optical signal is output from the first monitoring port 12 for optical signal monitoring.

Further, the optical signal distribution ratio is adjusted by the optical splitting device, to ensure the monitoring line corresponding to the monitoring cable obtains 1%-5% of optical information. In this example, preferably, the monitoring line obtains 3% of optical information, and the corresponding communication line obtains 97% of optical information. This can achieve optical signal monitoring without affecting the normal communication quality.

When the first communication port 11 is used as the incoming end of the optical splitter 1, the first communication port 11 is connected to an end a of the communication cable; the second communication port 13 and the second monitoring port 14 are used as the outgoing end of the optical splitter 1, the second communication port 13 is connected to an end b of the communication cable, and the second monitoring port 14 is connected to the monitoring cable. In this case, the end a of the communication cable, the first communication port 11, the second communication port 13, and the end b of the communication cable form a new communication line for optical information transmission. In addition, the end a of the communication cable, the first communication port 11, the second monitoring port 14, and the monitoring cable form a monitoring line for monitoring whether there is an optical signal in the line and whether the optical loss is normal. In this way, the use of each line and whether there is a fault in each channel can be determined. If the optical power loss exceeds a threshold, it indicates that the corresponding line is fault and timely investigation and processing are needed.

When the second communication port 13 is used as the incoming end of the optical splitter 1, the second communication port 13 is connected to the end b of the communication cable; the first communication port 11 and the first monitoring port 12 are used as the outgoing end of the optical splitter 1, the first communication port 11 is connected to the end a of the communication cable, and the first monitoring port 12 is connected to the monitoring cable. In this case, the end b of the communication cable, the second communication port 13, the first communication port 11, the end a of the communication cable form a new communication. In addition, the end b of the communication cable, the second communication port 13, the first monitoring port 12, and the monitoring cable form a monitoring line for monitoring whether there is an optical signal in the line and whether the optical loss is normal. In this way, the use of each line and whether there is a fault in each channel can be determined. If the optical power loss exceeds a threshold, it indicates that the corresponding line is fault and timely investigation and processing are needed.

If the initial incoming end of the optical splitter is not consistent with the transmission direction of the optical signal or the transmission direction of the optical signal changes, after the optical splitter is connected to the original communication line, that is, the first communication port and the second communication port of the optical splitter are connected to the communication cable in the original communication line, the initial monitoring port cannot receive the signal. In this case, the staff can learn of the actual transmission direction of the optical signal in the communication line, to achieve the optical splitting and monitoring function. In this case, only the initial unused monitoring port needs to be connected into the monitoring line to achieve optical signal monitoring, which is simple and convenient for operation and can adapt to different application scenarios.

In another example, the optical splitting device is specifically an optical splitter sheet provided with a semi-transparent semi-reflective film. In this example, the optical splitter sheet specifically includes two splitter sheets, namely, a first optical splitter sheet and a second optical splitter sheet. Certainly, multiple optical splitter sheets may be disposed to further adjust the optical signal distribution ratio. In this example, the reflectivity of the first or second optical splitter sheet is 1%-5%, preferably 3%. The transmittance of the first optical splitter or second optical splitter sheet is 95%-99%, preferably 97%. The incoming end of the first optical splitter sheet is the first communication port, and the reflecting end of the first optical splitter sheet is the first monitoring port; the incoming end of the second optical splitter sheet is the second communication port, the reflecting end of the second optical splitter sheet is the second monitoring port, the two communication ports are connected in series to the communication cable, and the monitoring port is connected to the monitoring cable; the first communication port 11 is used as the incoming end of the optical splitter, the second communication port 13 and the second monitoring port 14 are correspondingly used as the outgoing end of the optical splitter; or the second communication port 13 is used as the incoming end of the optical splitter, and the first communication port 11 and the first monitoring port 12 are used as the outgoing end of the optical splitter.

More specifically, the first optical splitter, the second optical splitter, and the two communication ports are on a same axis, and the two optical splitter are disposed at an inclination with respect to the axis. The axis of the two monitoring ports and the axis of the corresponding communication ports are symmetrical with respect to the midperpendicular of the corresponding optical splitter sheets. To be specific, the axis of the first monitoring port and the axis of the first communication port are symmetrical with respect to the midperpendicular of the first optical splitter sheet, and the axis of the second monitoring port and the axis of the second communication port are symmetrical with respect to the midperpendicular of the second optical splitter second. In this case, when the optical signal enters through the first communication port, 3% of the optical signal is reflected by the first optical splitter sheet and emitted through the first monitoring port, and the remaining 97% of the optical signal is emitted through the second communication port; similarly, when the optical signal enters from the second communication port, 3% of the optical signal is reflected by the second optical splitter and emitted through the second monitoring port, and the remaining 97% of the optical signal is emitted through the first communication port.

In the foregoing two examples, the optical splitter is compatible with two monitoring ports. When the transmission direction of the optical signal in the communication line changes or is uncertain, the outgoing end can always provide two transmission paths (the communication port and the monitoring port) to realize both the optical signal transmission function and monitoring function, thereby enhancing the reliability of the entire fiber optic communication network. Further, the incoming end of the optical splitter 1 is directly connected to the existing communication line or the wire inlet/outlet of the existing fiber splice tray, which can realize optical signal transmission and monitoring based on the original communication line, and is suitable for reconstruction of the fiber optic communication network.

In an example, the first communication port 11 is connected to a first connection cable 21, and preferably, the first connection cable 21 is spliced to the communication cable, to minimize the optical loss. Further, the first connection cable 21 is provided with a first fiber optic connector 22, preferably, a male end of a fiber optic connector, and the communication cable is correspondingly provided with a female end that fits the male end. The male end is plugged into the female end to connect the first connection cable 21 to the communication cable, and the whole connection process is simple and convenient.

In an example, the second communication port is connected with a second connection cable, and preferably, the second connection cable 23 is spliced to the communication cable, to minimize the optical loss. Further, the second connection cable 23 is provided with a second fiber optic connector 24, preferably a male end of a fiber optic connector, and the communication cable is correspondingly provided with a female end that fits the male end. The male end is plugged into the female end to connect the second connection cable 23 to the communication cable, and the whole connection process is simple and convenient.

In an example, the fiber optic connector is any one of an SC fiber optic connector, an FC fiber optic connector, an LC fiber optic connector and an ST fiber optic connector, and is selected according to the actual use scenarios.

In an example, the first monitoring port 12 is connected to a first Multi-fiber Push On (MPO) pigtail, and includes a third connection cable 25 and a first MPO connector 26; the second monitoring port 14 is connected to a second MPO pigtail, and includes the fourth connection cable 27 and the second MPO connector 28. The MPO connection cable facilitates cable information monitoring in a high-density integrated fiber optic environment, and simplifies line layout of the fiber optic network. Preferably, the first MPO connector 26 and the second MPO connector 28 are integrated on the side of the fiber splice tray, which facilitates the entry and exit of optical splitting fibers and fiber jumpers.

The above examples are combined to obtain a preferred example A in the reconstruction scenario of the fiber optic communication network. In this case, the first communication port 11 of the optical splitter 1 is connected to a first pigtail, the first pigtail is the first connection cable 21 and the first fiber optic connector 22, and the first fiber optic connector is preferably the male end of the fiber optic connector; the second communication port is connected to a second pigtail, the second pigtail is the second connection cable 23 and the second fiber optic connector 24, and the second fiber optic connector is preferably the male end of the fiber optic connector. The two monitoring ports are connected to MPO pigtails. In a use scenario, the male end of the first fiber optic connector 22 of the optical splitter 1 is connected to the adapter 33 at the wire outlet of the fiber splice tray. In this case, the optical fiber at the wire inlet of the fiber splice tray is connected to the communication cable (incoming cable). The male end of the second fiber optic connector 24 of the optical splitter 1 is connected to the communication cable (outgoing cable), and the MPO connector is connected to the corresponding fiber optic connector on the monitoring cable, to complete re-construction of the original communication network. In this case, the incoming cable is connected to the outgoing cable through the wire inlet, the wire outlet, the first communication port, and the second communication port of the fiber splice tray, to form a new communication line, and the incoming cable is connected to the monitoring cable through the wire inlet, the wire outlet, the first communication port, and the monitoring port of the optical splitter 1 to form a new monitoring line, so as to convert an original single-way information transmission path (the path formed by connecting the incoming cable to the outgoing cable) into a two-way transmission path compatible with the optical information transmission and monitoring functions.

In another example, the above examples are combined to obtain a preferred example B in the reconstruction scenario of the fiber optic communication network. In this case, the first communication port 11 of the optical splitter 1 is connected to a first connection cable, the second communication port 13 is connected to a second connection cable, and the two monitoring ports are connected to MPO pigtails.

This application further provides a fiber splice tray for optical information sampling analysis. A fiber splice tray body 3 is provided with the optical splitter for optical signal detection according to any one or more of the foregoing examples. Specifically, the fiber splice tray body 3 is a two-layer structure, the upper layer includes a fiber winding body 32, a splice region 31, the fiber winding body is provided with a crimping column, an outer wall of the crimping column is provided with an anti-slip rubber pad that is arranged in a wavy shape, and the fiber winding body 32 is round or oval to avoid fiber breakage. The lower layer is a cavity adapted to the structure of the fiber splice tray body 3, for storing redundant cables; the fiber splice tray includes a wire inlet and outlet, and the wire outlet is provided with an adapter 33 for connecting to a fiber optic connector. After an outer sheath of the fiber optic cable is removed in the original communication line, a first optical fiber 4 (the optical fiber in the communication cable) enters the fiber splice tray through the wire inlet of the fiber splice tray, and the first optical fiber 4 is connected to the first communication port or the second communication port. In an example, the adapter 33 is disposed to be inclined to the horizontal plane of the fiber splice tray body, for example, at a 20° oblique angle to the horizontal plane, to protect the bending radius of the optical fiber, so as to extend the service life of the cable.

Figure 9:
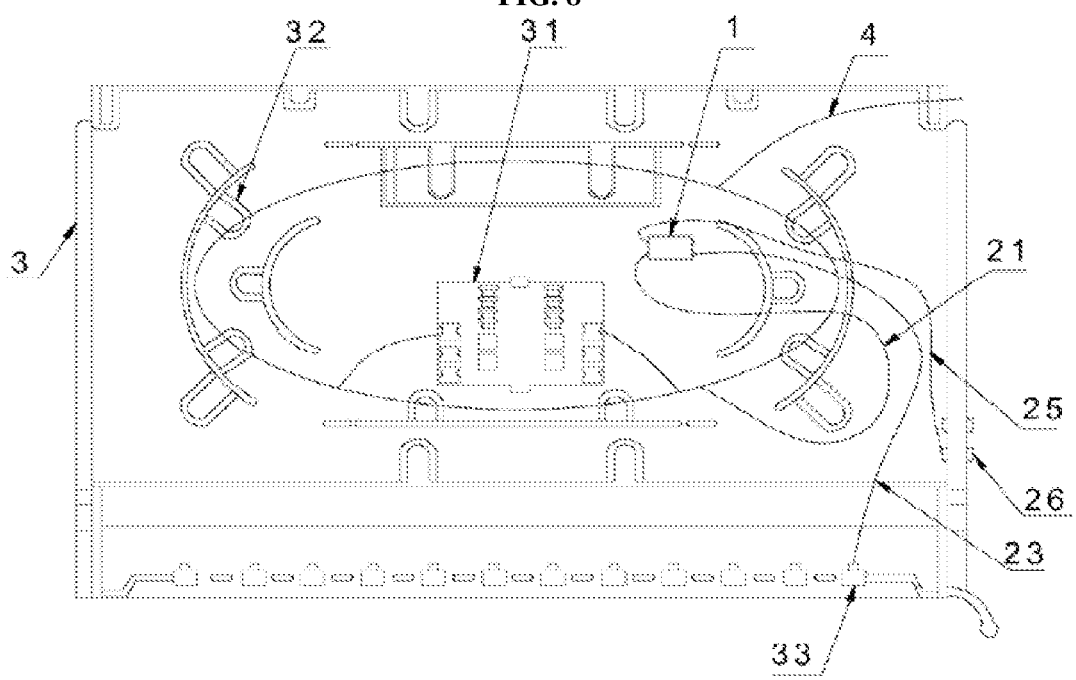
FIG. 9 is a schematic structural diagram of a fiber splice tray according to another embodiment of the present disclosure.

When the first fiber is connected to the first communication port 11 after the outer sheath of the communication cable is removed, the second communication port 13 of the optical splitter 1 is connected to the adapter 33 at the wire outlet of the fiber splice tray, for example, a fiber flange; the two monitoring ports of the optical splitter 1 are connected to MPO-type pigtails, and the side of the fiber splice tray is provided with a pass-through slot for placing the MPO connectors, such that the MPO connectors can be exposed on the outside of the fiber splice tray to facilitate wiring. As shown in FIG. 9, when the first communication port 11 is used as the input end, that is, the optical signal is input through the wire inlet of the fiber splice tray, the end a of the communication cable, the first optical fiber 4, the first connection cable 21, the first communication port 11, the second communication port 13, the second connection cable 23, the adapter 33, and the end b of the communication cable are connected to form the optical information transmission path; the end a of the communication cable, the first optical fiber 4, the first connection cable 21, the first communication port 11, the second monitoring port 14, the fourth connection cable 27, the second MPO connector 28, and the monitoring cable are connected to form a new optical information monitoring path.

When the transmission direction of the optical signal changes or the initially specified transmission direction of the optical signal does not match the actual transmission direction, as shown in FIG. 7, that is, when the optical signal is input via the adapter at the wire outlet of the fiber splice tray, the end b of the communication cable, the adapter 33, the second connection cable 23, the second communication port 13, the first communication port 11, the first connection cable 21, the first optical fiber 4, the end a of the communication cable are connected to form a new optical information transmission path, and the end b of the communication cable, the adapter 33, the second connection cable 23, the second communication port 13, the first monitoring port 12, the third connection cable 25, the second MPO connector 26, and the monitoring cable are connected to form a new optical information monitoring path.

In summary, when the transmission direction of the optical signal changes or the initially specified transmission direction of the optical signal does not match the actual transmission direction, only the initial unused monitoring port in the optical splitter 1 needs to be connected to the monitoring cable to achieve both optical signal transmission and monitoring.

In this example, the fiber splice tray integrating the optical splitter 1 is used to replace the existing fiber splice tray, such that the fiber splice tray has the light splitting function while also enabling the transmission and monitoring of the optical signal when the transmission path of the optical signal changes or is uncertain. This is suitable for new construction of the fiber optic communication network.

Figure 8:
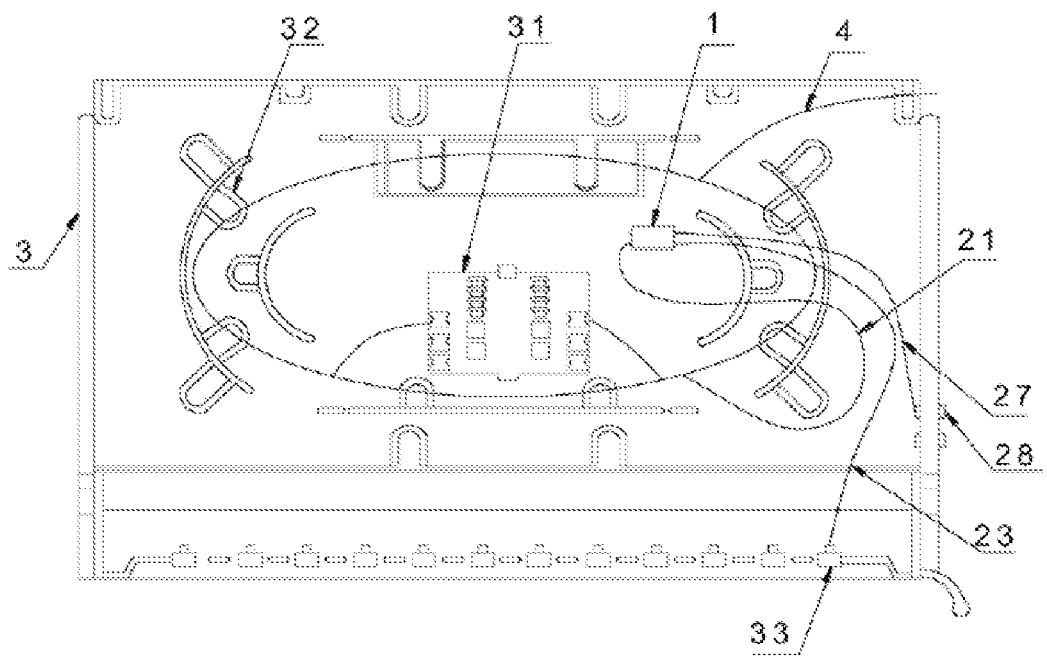
FIG. 8 is a schematic structural diagram of a fiber splice tray according to an embodiment of the present disclosure.

In an example, the first optical fiber is spliced to the connection cable of the first communication port or the second communication port. As shown in FIG. 8 and FIG. 9, the first optical fiber 4 is directly spliced to the first connection cable, which minimizes optical loss and reduces system cost. In an example, the adapter 33 is spliced to one end of the connection cable and the other end of the connection cable is spliced to the corresponding port of the optical splitter 1.

In an example, a fiber splice tray includes a fiber splice tray body 3 and a splice region 31. The fiber splice tray body 3 is provided with an optical splitting unit, and the optical splitting unit integrates 12 optical splitters described in the preferred example B. The fiber splice tray is a 12-core fiber splice tray, and 12-core optical fibers (or 12 optical fibers) entering through the wire inlet of the fiber splice tray are connected to the first connection cable 21 or the second connection cable 23 through the splice region. In this case, the connection cables are both 12-core connection cables. When the 12-core optical fibers are spliced to fiber cores in the first connection cable 21, each fiber core in the second connection cable 23 is connected to each adapter 33 at the wire outlet of the fiber splice tray; when the 12-core fibers are spliced to fiber cores in the second connection cable 23, each fiber core in the first connection cable 21 is connected to each adapter 33 at the wire outlet of the fiber splice tray. Certainly, the number of optical splitters in the optical splitting unit and the type of the fiber splice tray (determined based on the quantity of fiber cores) may vary according to the actual application scenarios, and it is not limited to only 12 optical splitters and 12-core fiber splice tray.

Figure 10:
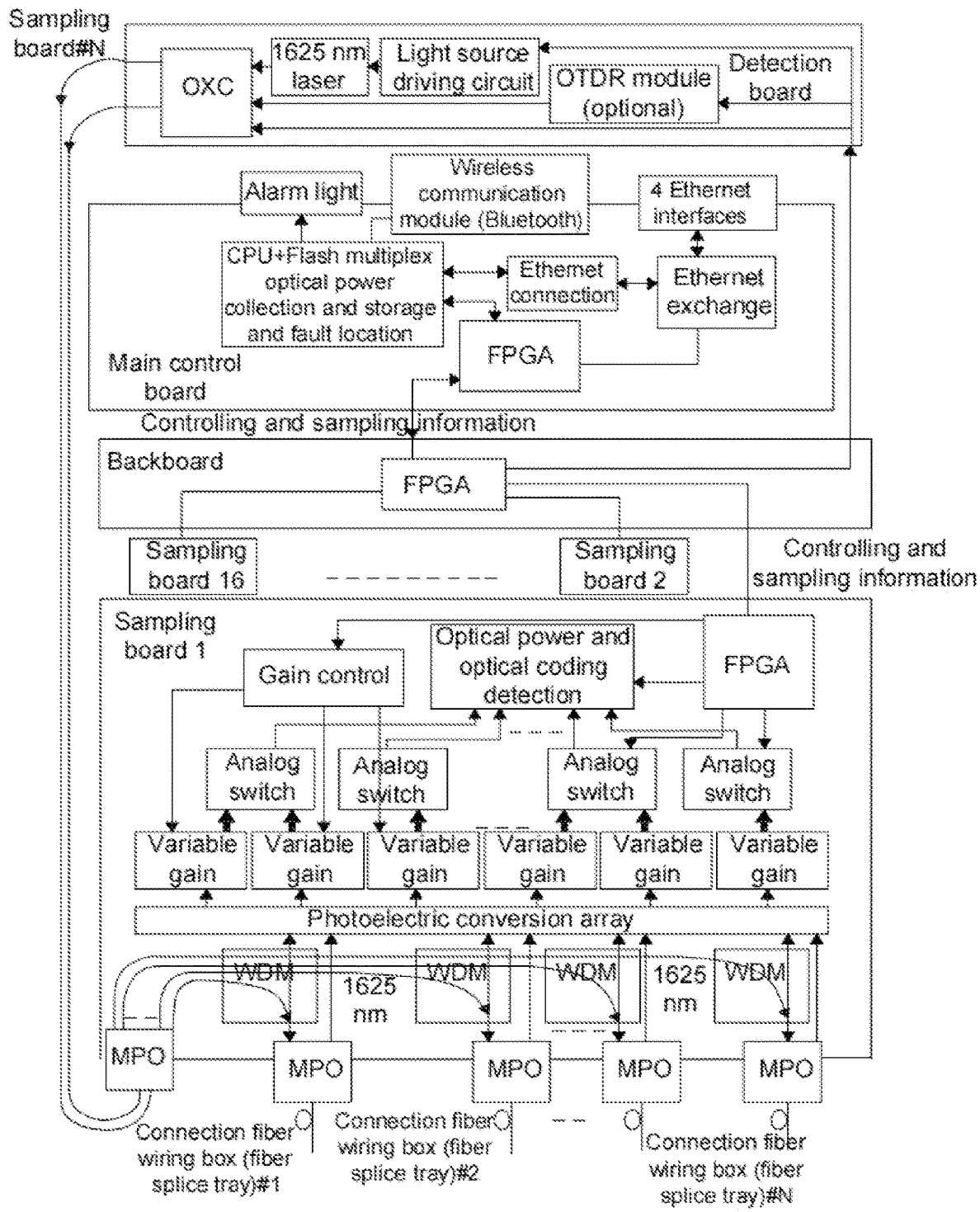
FIG. 10 is a schematic diagram of the circuit principle of local side sampling equipment according to another embodiment of the present disclosure.

This application further provides local side sampling equipment for information sampling analysis, including the above optical splitter, and further includes multiple sampling boards as shown in FIG. 10. The sampling boards are connected to an optical splitter via an optical fiber or a fiber optic cable and are used to pre-process an optical and/or electrical signal; the sampling board is signally connected to a backboard via a fiber optic cable, and the backboard is used for collecting and forwarding a signal collected by the sampling board; the backboard is signally connected to a master control board via a fiber optic cable; the master control board is connected to a communication device and is connected to an Ethernet through the communication device; the local side sampling equipment further includes a detection board that is signally connected to the backboard, and the detection board is signally connected to the sampling board via an optical fiber. Specifically, the local side sampling equipment has a physical interface (a serial or LAN interface), which can be logged in directly through a personal computer (remote login) and can record and save the ODF port serial number connected to each optical port; and there are at least two network interfaces (LAN interfaces), which can be connected to the platform through an IP network. The local side sampling equipment can regularly receive the service light separated by the optical splitter, determine whether there is an optical signal, and encapsulate the reception time, transceiver identification, ODF terminal information, optical power and the like in an IP message and send to the platform. Certainly, in an option, the local side sampling equipment can receive the platform's instruction to actively test optical signal and optical decay on a specified fiber core.

Further, multiple pieces of local side sampling equipment installed in the central server room and remote server rooms form a tandem topology, multiple fiber cores of adjacent tandem cables are interconnected through the fiber splice tray on the ODF, and optical split detection fibers from the fiber splice tray are connected to the local side sampling equipment; each piece of local side sampling equipment is connected to the platform through the Ethernet interface in the server room, data on the interconnection status between multiple fiber cores can be reported to and saved on the platform server, and data on the interconnection status of idle fibers of all fiber optic cables in all regions are detected, reported to and saved on the platform server in the same way, to achieve audit and unified management of fiber optic resources across the network.

Specifically, the sampling board includes a plurality MPO connectors that are connected to the optical splitter and detection boards via optical fibers. The sampling board includes a photoelectric conversion array, an amplification circuit, an optical power and optical coding detection circuit, a main processor field-programmable gate array (FPGA). The MPO connector is connected to the photoelectric conversion array, the photoelectric conversion array is connected to a variable gain circuit, the variable gain circuit is connected to the optical power and optical coding detection circuit, and the optical power and optical coding detection circuit is connected to the main processor FPGA. Further, multiple analog switches are provided for enabling a plurality of photoelectric signal sources, the variable gain circuit is connected to a gain control circuit, the gain control circuit is connected to the processor FPGA, one terminal of the variable gain circuit is connected to the photoelectric conversion array, and the other terminal of the variable gain circuit is electrically connected to the optical power and optical coding detection circuit through the analog switches.

Further, the sampling board is used to pre-process the optical signal, and multiple sampling boards are connected to the backboard. The backboard is used to collect and forward signals collected by the sampling board; the backboard forwards the signals from the sampling board to the main control board; the main control board is connected to a communication device, and connected to the Ethernet through the communication device; the main control board includes a multiplex optical power and optical coding data receiving and storage unit, a multiplex optical power comparison analysis and fault optical path location unit, a detection board optical coding control circuit, an alarm unit, and a processor; the multiplex optical power and optical coding data receiving and storage unit, the multiplex optical power comparison analysis and fault optical path location unit, the detection board optical coding control circuit, the alarm unit, the communication unit and the processor are signally connected.

Further, the detection board includes a control circuit, the control circuit is connected to a light source driving circuit, and the light source driving circuit is connected to a laser; the detection board includes an optical cross-connect (OXC) network, and the OXC network is connected to the laser and the MPO connector on the sampling board through an optical line.

Optionally, the detection board may be provided with an optical time domain reflectometer (OTDR) module, the OTDR module is signally connected to the control circuit, the OTDR module is connected to the OXC network, and the OTDR module is used for detecting optical fiber damage spots.

More specifically, the detection board includes the OXC network, a laser to monitor a dedicated wavelength (1625 nm) and a control circuit, a selected OTDR module, and the like. Specific optical pulse code is inserted into a selected free optical fiber through the OXC network. The local side optical signal sampling equipment identifies the connection relationship of the idle optical fiber by detecting the optical code, to achieve code registration of all idle optical fibers across the network to facilitate unified scheduling of the optical fiber resources. If the optical pulse coding is replaced by an OTDR detection signal, precise location of the inserted optical fiber connector or breakpoint can be achieved, which further improves the accuracy of optical fiber maintenance.

Optionally, the electrical signal collected by the optical splitter can be connected directly to the variable gain circuit.

During actual engineering, in an option, a handheld light source may be provided, and the handheld light source emits the same optical signal as the detection board to cooperate with workers for detecting the optical fiber. The handheld light source includes a laser, a pulse light coding generation circuit and a driver circuit, the pulse light coding generation circuit is connected to the laser signal through the driver circuit, the handheld light source includes a communication module, and the handheld light source is communicatively connected to the main control board through the communication module.

In the specific operation process, the optical splitter collects the optical signal and sends to the MPO connector, the MPO connector forwards the optical signal to the photoelectric conversion array, and the photoelectric conversion array converts the optical signal into an electrical signal. The photoelectric conversion array may detect the light in the upper and lower channels of an optical fiber through one photoelectric device. Then the signal is amplified to an appropriate intensity through the variable gain circuit and transmitted to the optical power and optical coding detection circuit through an analog switch. The optical power and optical coding detection circuit decomposes the optical power and coding information of the signal and forwards to the backboard through the main processor FPGA. The backboard sends the signal to the main control board, the main control board stores and further analyzes the data, and processes the signal through the multiplex optical power comparison analysis and fault optical path location unit and the detection board optical encoding control circuit, to obtain the connection status and connection quality of the optical fiber, which are then sent to the platform in the form of a TCP message.

During detection, the detection board drives the laser through the light source driving circuit to emit an optical signal with specific frequency and coding, the optical signal is sent to the MPO connector through the OXC network, and then transmitted to the optical fiber through the MPO connector, such that the optical signal is delivered to the other end connected to the optical fiber and detected by another local side signal sampling equipment. In this way, the cooperation between the multiple pieces of local side sampling equipment can realize status detection of optical fiber resources across the network; the optical signals in the optical fibers are collected and identified, and can be transmitted to the network through the communication device. In addition, the detection board is disposed to directly detect the connection status, the quality, and the failure spots of the optical fibers. This resolves the problem that the connection relationship of the idle fiber core in the adjacent fiber optic cable cannot be detected when the fiber core is occupied or is idle.

The application further provides an information sampling analysis platform, including the above-mentioned optical splitter or fiber splice tray containing the optical splitter, and further including the above-mentioned local side sampling equipment, as well as the local side equipment, the terminal device and the back-end control subsystem. The local side equipment is connected to the optical fiber port of the optical splitter, another communication port of the optical splitter is connected to the local side equipment or the terminal device, the monitoring port of the optical splitter is connected to the local side sampling device, and the other end of the local side sampling device is connected to the back-end control subsystem. The back-end control subsystem is preferably a PC with strong data processing capability.

Further, the back-end control subsystem further includes an information analysis software system deployed in the cloud, and the system may include a user communication line information database distributed in the local side sampling equipment, installation and maintenance terminal management software, local side unified network management software and a database. The information analysis software system is signally connected to the local side sampling equipment through the network, and the information analysis software system is signally connected to the installation and maintenance terminal management software through the network. The whole information analysis software system is used to store and process the resource management of the optical fibers, and can facilitate staff inquiry and construction, thereby realizing the unified management of optical fiber resources across the network, reducing the complexity of optical network maintenance, and reducing the cost for monitoring optical fibers during optical network maintenance.

The above embodiments are merely further description of the present disclosure, and the embodiments of the present disclosure are not limited to the description. For those of ordinary skill in the art, several simple deductions or substitutions may be made without departing from the concept of the present disclosure, but the deductions or substitutions should fall within the protection scope of the present disclosure.

What is claimed is:

1. An information sampling analysis method, wherein the method is executed by an information sampling analysis platform, the information sampling method comprising:
  a communication line information determining step including:
    receiving sampling information that is sent by local side sampling equipment and has been split by an optical splitter or sampling information that is sent by local side sampling equipment and has been split by an optical splitter and on which photoelectric conversion has been performed, wherein the sampling information comprises time stamp information, an ID of the local side sampling equipment, a logical ID and a first message sequence, the logical ID is encrypted information obtained after the ID of the local side sampling equipment, optical distribution frame (ODF) identifier and the first message sequence are encrypted by a hash algorithm, the first message sequence comprises a board number, a port serial number, ODF terminal information, local side transceiver identifier, line occupation identifier, signal power information, and signal power change identifier;
    receiving monitoring data sent by a terminal device, wherein the monitoring data comprises the time stamp information, ID information of the terminal device, terminal transceiver identifier information, and a second message sequence;
    determining whether a service signal exists on a corresponding communication line based on the line occupation identifier and the local side transceiver identifier;
    establishing a path mapping relationship between the terminal device and local side equipment corresponding to the local side sampling equipment based on an ID of the terminal device and the ID of the local side sampling equipment, and extracting pre-stored ODF terminal information and fiber core physical connection information, to obtain real-time communication line information; and
    comparing whether the real-time communication line information is the same as pre-stored communication line information, and if not, locating and correcting error information in the pre-stored communication line information.

2. The information sampling analysis method according to claim 1, further comprising:
  an initialization step including: sending initialization query information to the local side sampling equipment; receiving and saving initialization information reported by the local side sampling equipment, and performing encryption processing on the ID of the local side sampling equipment, the ODF identifier, and the first message sequence in the initialization information through the hash algorithm, to generate the logical ID; and
  a sampling information determining step including: receiving the sampling information sent by the local side sampling equipment and determining, based on the logical ID in the sampling information, whether a board and/or port of the local side sampling equipment have/has changed; and if yes, performing the initialization step; or if not, saving the sampling information and performing the communication line information determining step.

3. The information sampling analysis method according to claim 1, further comprising a signal power information update step:
  receiving the sampling information sent by the local side sampling equipment; and
  determining whether information about the signal power change identifier in the current sampling information is different from information about the signal power change identifier in sampling information of a previous frame; and if not, skipping any operation; or if yes, saving the signal power information in the current sampling information.

4. The information sampling analysis method according to claim 1, further comprising a communication line verification step executed by the terminal device and specifically comprising:
  receiving real-time communication line information sent by the information sampling analysis platform, and performing routing based on the real-time communication line information, to verify whether the real-time communication line information is correct.

5. The information sampling analysis method according to claim 1, further comprising a verification step executed by the terminal device and specifically comprising:
  receiving code-containing handshake information required to open a corresponding service and sent by the information sampling analysis platform; and
  verifying the corresponding terminal device based on the code-containing handshake information, and if the verification succeeds, opening the corresponding service.

6. An optical splitter for information sampling analysis, comprising:
  an optical splitting device disposed in the optical splitter to split at least two optical signals in two;
  a first communication port;
  a first monitoring port;
  a second communication port; and
  a second monitoring port are disposed on the optical splitting device;

wherein the first communication port is used as an incoming end of the optical splitter, the second communication port and the second monitoring port are correspondingly used as an outgoing end of the optical splitter; or the second communication port is used as an incoming end of the optical splitter, and the first communication port and the first monitoring port are correspondingly used as an outgoing end of the optical splitter; and wherein the communication ports are connected to a communication cable, the monitoring ports are connected to a monitoring cable, and an optical signal obtained by the communication port corresponding to the outgoing end of the optical splitter accounts for 95%-99%.

7. A local side sampling equipment for information sampling analysis, the local side sampling equipment comprising:

multiple sampling boards;

wherein the multiple sampling boards are connected to an optical splitter via an optical fiber or a fiber optic cable and are used to pre-process an optical and/or electrical signal;

wherein the sampling board is signally connected to a backboard via a fiber optic cable, and the backboard is used for collecting and forwarding the signal collected by the sampling board; the backboard is signally connected to a master control board via a fiber optic cable;

wherein the master control board is connected to a communication device and is connected to an Ethernet through the communication device;

a detection board that is signally connected to the backboard, and the detection board is signally connected to the sampling board via an optical fiber.

* * * * *